(12) United States Patent
Reddy

(10) Patent No.: US 8,201,596 B2
(45) Date of Patent: Jun. 19, 2012

(54) METHOD OF FILLING A FUEL TANK

(75) Inventor: Sam R. Reddy, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 387 days.

(21) Appl. No.: 12/564,066

(22) Filed: Sep. 22, 2009

(65) Prior Publication Data

US 2011/0067777 A1 Mar. 24, 2011

(51) Int. Cl.
*B65B 1/04* (2006.01)
(52) U.S. Cl. .......................... 141/374; 141/382; 141/392
(58) Field of Classification Search ............... 141/323, 141/374, 382, 392
See application file for complete search history.

(56) References Cited

U.S. PATENT DOCUMENTS

| | | | | |
|---|---|---|---|---|
| 3,865,270 A * | 2/1975 | Petersson | ...................... | 220/721 |
| 4,109,687 A * | 8/1978 | King | ................... | 141/5 |
| 4,501,374 A * | 2/1985 | Robertson | .................... | 220/86.2 |
| 4,869,283 A * | 9/1989 | Oeffling et al. | ................. | 137/43 |
| 5,360,040 A * | 11/1994 | Thorn et al. | .................... | 141/98 |
| 5,570,672 A * | 11/1996 | Kunimitsu et al. | ........... | 123/516 |
| 5,755,256 A * | 5/1998 | Elsdon et al. | ................. | 137/390 |
| 6,324,749 B1 * | 12/2001 | Katsuura et al. | ................ | 29/703 |
| 6,334,252 B1 * | 1/2002 | Sato et al. | .................... | 29/897.2 |

* cited by examiner

*Primary Examiner* — Timothy L Maust
(74) *Attorney, Agent, or Firm* — Quinn Law Group, PLLC

(57) ABSTRACT

A method of initially filling a new and previously unused fuel tank with a fuel including Volatile Organic Compounds includes providing a dispensing unit with an elongated flexible dispensing tube, inserting the dispensing tube through a fuel inlet of the fuel tank until the dispensing tube is disposed adjacent a bottom surface of the fuel tank, and introducing the fuel onto the bottom surface of the fuel tank in a smooth flow without spraying the fuel. Introduction of the fuel onto the bottom surface of the fuel tank in a smooth flow disposes any fuel vapors formed therein adjacent the bottom surface of the fuel tank to limit displacement of the fuel vapor into the atmosphere outside the fuel tank as the air in the fuel tank is exhausted in response to filling the fuel tank.

19 Claims, 2 Drawing Sheets

METHOD OF FILLING A FUEL TANK

TECHNICAL FIELD

The present invention generally relates to a method and system for filling a fuel tank, and more specifically to a method and system for filling a new, unused fuel tank.

BACKGROUND OF THE INVENTION

Vehicles are assembled in assembly plants with a green, i.e., an unused and empty, fuel tank. Once assembly of the vehicle is complete, the fuel tank is at least partially filled with fuel, typically a fossil fuel. Fossil fuels include Volatile Organic Compounds (VOCs), such as hydrocarbons. VOCs are organic chemical compounds that have a high enough vapor pressure under normal conditions to significantly vaporize and enter the atmosphere. VOCs are considered an air pollutant, and the level of VOCs present in the air is often regulated by governmental agencies for air quality purposes.

The green fuel tanks are initially empty, i.e., contain only air. During initial fueling of the green fuel tanks, the fuel is dispensed into the fuel tank as a spray. The sprayed fuel instantaneously flashes and mixes with the air in the fuel tank, such that the entire fuel tank is filled with an air/fuel mixture. As the fuel tank is filled, a volume of the air/fuel vapor mixture is exhausted from the fuel tank into the manufacturing plant. Accordingly, the process of filling the green fuel tanks in the assembly plant introduces VOCs into the manufacturing plant through the air/fuel vapor mixture exhausted from the fuel tanks during the fuel tank filling process.

SUMMARY OF THE INVENTION

A method of filling a fuel tank with a fuel is provided. The fuel tank includes a fuel inlet and a vapor outlet, and the fuel includes volatile organic compounds. The method includes providing a dispensing unit configured to introduce the fuel; and introducing the fuel into the fuel tank adjacent a bottom surface of the fuel tank. The fuel is introduced adjacent the bottom surface of the fuel tank so that any fuel vapors formed during introduction of the fuel into the fuel tank are disposed adjacent the bottom surface of the fuel tank, to thereby limit exhaust of the fuel vapors through the vapor outlet during introduction of the fuel into the fuel tank.

In another embodiment, a method of filling a fuel tank with a fuel is provided. The fuel tank includes a fuel inlet, and a vapor outlet disposed near a top surface of the fuel tank. The fuel includes hydrocarbons. The method comprises providing a dispensing unit including an elongated flexible dispensing tube extending from the dispensing unit to a distal end; inserting the elongated flexible dispensing tube through the fuel inlet until the distal end of the dispensing tube is disposed adjacent a bottom surface of the fuel tank; and introducing the fuel into the fuel tank adjacent the bottom surface of the fuel tank. The fuel is introduced into the fuel tank adjacent the bottom surface of the fuel tank so that any fuel vapors formed during introduction of the fuel into the fuel tank are disposed adjacent the bottom surface of the fuel tank, to thereby limit exhaust of any fuel vapors through the vapor outlet during introduction of the fuel into the fuel tank.

A system for filling a fuel tank of a vehicle with a fuel including volatile organic compounds is also provided. The system includes, a conveyor apparatus configured for conveying a plurality of individual vehicles along an assembly line. A dispensing unit is disposed adjacent the conveyor apparatus. The dispensing unit is configured for dispensing the fuel into the fuel tank. The dispensing unit includes an elongated flexible dispensing tube, which extends from the dispensing unit to a distal end. The dispensing tube is configured for insertion through a fuel inlet of the fuel tank to a bottom surface of the fuel tank. The dispensing tube dispenses the fuel onto the bottom surface of the fuel tank in a smooth flow without spraying the fuel to minimize turbulence in the flow of fuel, such that any fuel vapors formed during introduction of the fuel into the fuel tank are disposed adjacent the bottom surface of the fuel tank. Disposing the fuel vapors adjacent the bottom surface of the fuel tank limits exhaust of the fuel vapors formed within the fuel tank through the vapor outlet during introduction of the fuel into the fuel tank.

Accordingly, the method and system for filling the fuel tank introduces the fuel into the bottom of the fuel tank in a smooth flow without spraying the fuel, thereby reducing turbulence in the flow of fuel entering the fuel tank. Introducing the fuel in a smooth flow adjacent the bottom surface of the fuel tank reduces the turbulence in the flow of fuel entering the fuel tank, vaporizing less of the fuel within the fuel tank during the filling process, and the fuel vapors that are formed are disposed adjacent the bottom surface of the fuel tank, leaving only unmixed air, e.g., air containing no or few fuel vapors, disposed near a top surface of the fuel tank adjacent the vapor outlet. By minimizing the fuel that is vaporized within the fuel tank and by ensuring that the fuel vapors that are formed are disposed adjacent the bottom surface of the fuel tank, the method and system for filling the fuel tank exhausts only unmixed air from the green fuel tank during the initial filling process. By exhausting only unmixed air during the initial filling process, the system and method for filling the green fuel tank limits the amount of fuel vapors introduced into the atmosphere of the assembly plant when the air is exhausted from within fuel tank in response to filling of the fuel tank. By limiting the amount of fuel vapors displaced from the fuel tank during the filling process, the method and system for filling the fuel tank minimizes the Volatile Organic Compounds (VOCs) released into the manufacturing plant, thereby improving air quality within the manufacturing plant.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
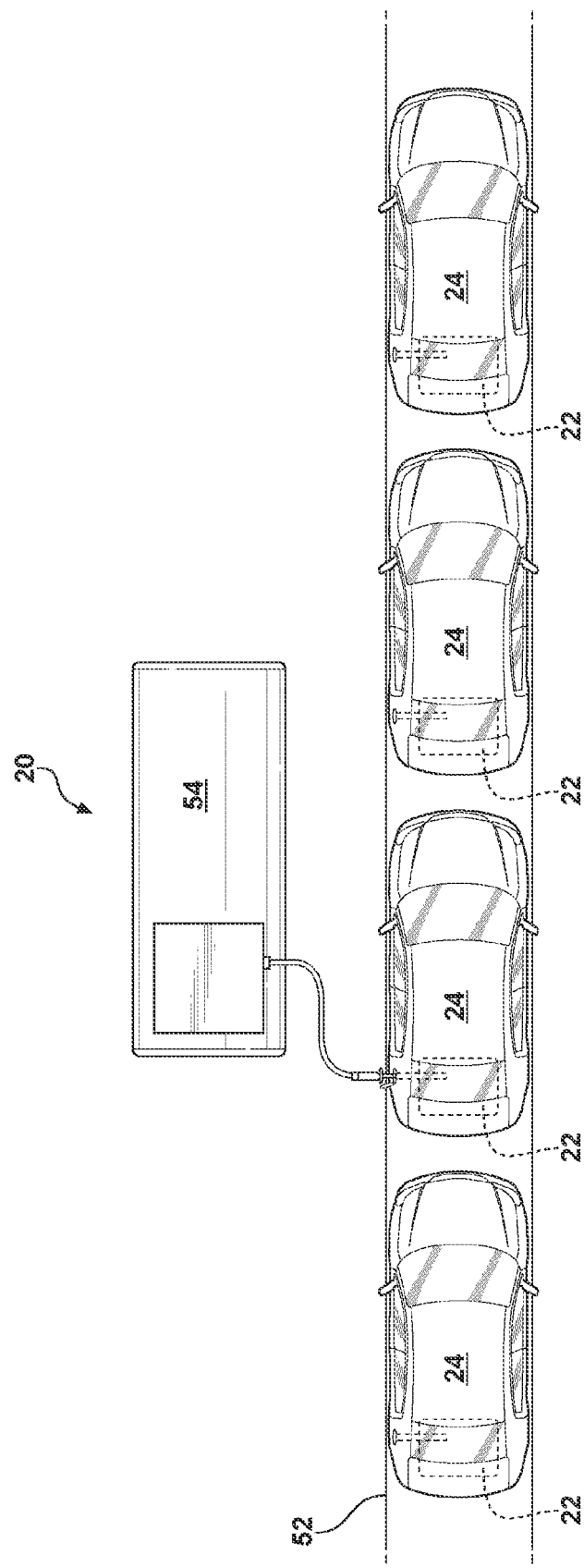
FIG. 1 is a schematic plan view of a system for filling a fuel tank in a manufacturing plant.
Figure 2:
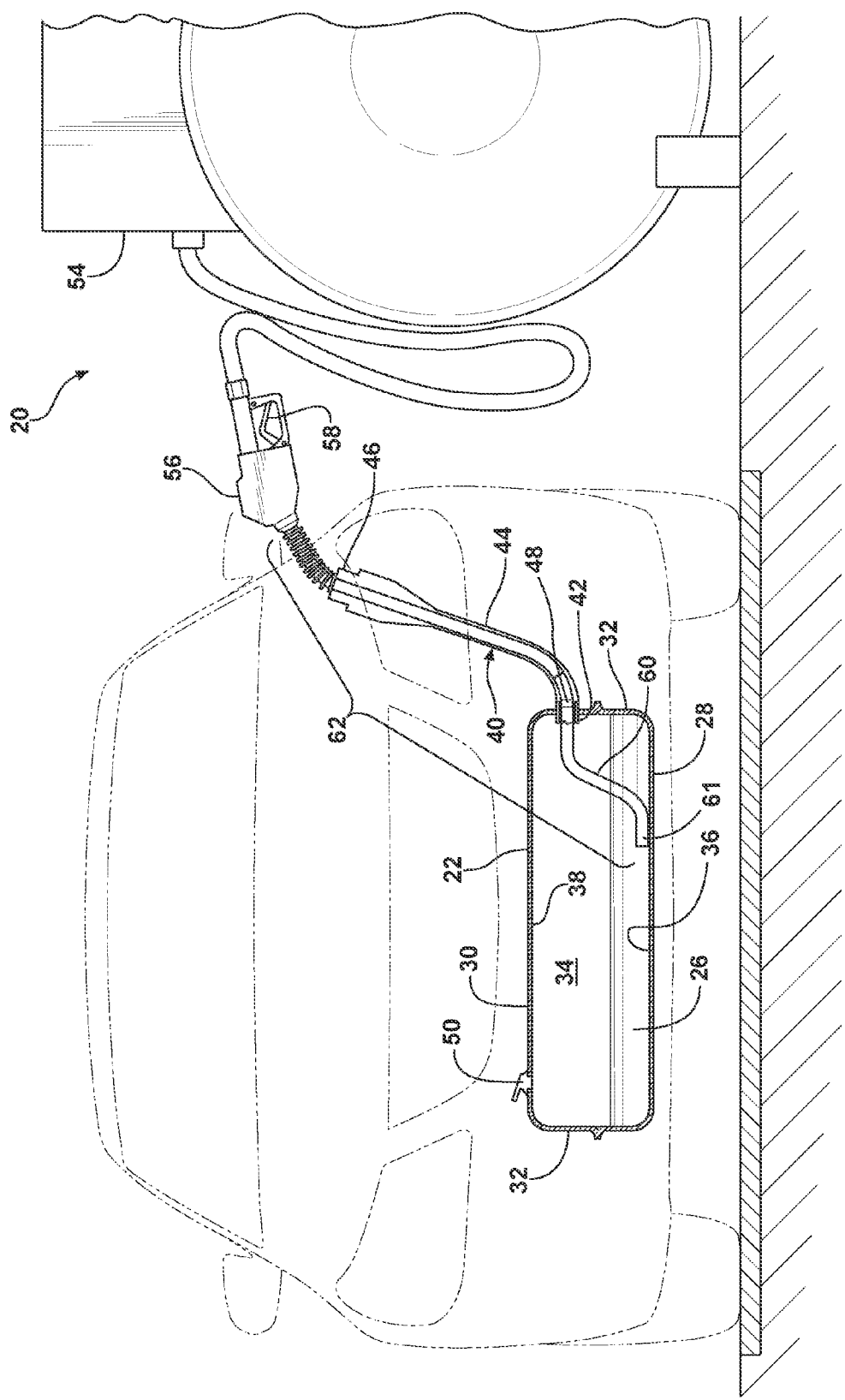
FIG. 2 is a schematic cross sectional view of the fuel tank being filled with a fuel by a fuel dispensing unit.

Referring to the Figures, wherein like numerals indicate corresponding parts throughout the several views, a fuel dispensing system is generally shown at 20.

The fuel dispensing system 20 fills a fuel tank 22 of a vehicle 24 with a fuel 26. The fuel 26 may include volatile organic compounds (VOCs). More specifically, the fuel 26 may include a fossil fuel 26, which include hydrocarbons. The fuel 26 may include gasoline, diesel fuel, or some other type of fuel suitable for use in an internal combustion engine. The fuel 26 may also include additives, such as ethanol or the like as is well known. The fuel 26 may include a Reid Vapor Pressure of at least 7 psi at ambient temperature when introduced into the fuel tank 22.

The fuel tank 22 is a green, i.e., new and unused fuel tank. The fuel tank 22 may include any suitable size and shape, and may be configured to fit within any pre-determined space constraints of the specific vehicles 24 in which the fuel tank 22 is installed. Additionally, the fuel tank 22 may be configured to meet any pertinent design and regulatory requirements for the intended use of the vehicle 24 and type of fuel 26 utilized therein.

The fuel tank 22 includes a bottom wall 28 and a top wall 30 spaced from the bottom wall 28. A plurality of side walls 32 extends between the bottom wall 28 and the top wall 30. The bottom wall 28, the top wall 30 and the plurality of side walls 32 cooperate to define an interior 34 defining a volume. The bottom wall 28 defines a bottom surface 36 disposed within the interior 34 of the fuel tank 22. Similarly, the top wall 30 defines a top surface 38 disposed within the interior 34 of the fuel tank 22.

The fuel tank 22 includes a fuel inlet 40. As shown, the fuel inlet 40 is disposed adjacent the top wall 30 of the fuel tank 22. The fuel inlet 40 defines an opening 42 into the interior 34 of the fuel tank 22. The opening 42 may be defined by the top wall 30. Alternatively, the opening 42 may be defined by one of the plurality of side walls 32, or by the bottom wall 28. Accordingly, it should be appreciated that the opening 42 need not be disposed adjacent the top wall 30. The fuel inlet 40 further includes a neck portion 44, which extends from the opening 42 in the fuel tank 22 to a filling end 46. The neck portion 44 may extend along a linear path, or alternatively may extend along a curvilinear path. The neck portion 44 is tubular and defines a passage therethrough.

The fuel tank 22 may include a back flow prevention device 48, such as a check valve or the like, to prevent the fuel 26 from flowing backwards through the neck portion 44 and spilling out the filling end 46. The back flow prevention device 48 is disposed within the neck portion 44 of the fuel inlet 40.

The fuel tank 22 further includes a vapor outlet 50. The vapor outlet 50 is disposed adjacent the top surface 38 of the fuel tank 22. The vapor outlet 50 may be separate from the fuel inlet 40, or may be integral with the fuel inlet 40. The vapor outlet 50 is configured to release gases from within the interior 34 of the fuel tank 22 in response to filling of the fuel tank 22. The volume of gases released from the interior 34 of the fuel tank 22 is at least equal to the volume of fuel 26 dispensed into the fuel tank 22. The release of the gases from within the fuel tank 22 prevents backpressure from building up within the fuel tank 22 during the fuel tank 22 filling process.

The fuel dispensing system 20 includes a conveyor apparatus 52. The conveyor apparatus 52 is configured to convey a plurality of individual vehicles 24 along an assembly line. The conveyor apparatus 52 is located within an assembly plant, and may include any suitable apparatus capable of moving vehicles 24 along a path between different work stations as is well known in the art.

The fuel dispensing system 20 further includes a dispensing unit 54. The dispensing unit 54 is located at one of the various work stations disposed along the conveyor apparatus 52. The dispensing unit 54 is configured to dispense the fuel 26 into the fuel tank 22. The dispensing unit 54 may include a bulk fuel 26 storage device for storing the fuel 26 prior to filling the fuel tank 22. The bulk fuel 26 storage device may be located within the manufacturing plant, or alternatively may be located outside the manufacturing plant and in fluid communication with the dispensing unit 54 within the manufacturing plant.

The dispensing unit 54 may include a handle 56 configured to release a flow of the fuel 26 when actuated. The handle 56 includes a lever 58 coupled to a valve (not shown) configured to actuate the dispensing unit 54. It should be appreciated that the dispensing unit 54 may include some other device not shown or described herein capable of selectively releasing a flow of fuel 26 to fill the fuel tank 22.

The dispensing unit 54 includes an elongated flexible dispensing tube 60. The dispensing tube 60 extends from the handle 56 of the dispensing unit 54 to a distal end 61. The dispensing tube 60 is attached to the handle 56 of the dispensing unit 54 in any suitable manner, such as through a clamped connection. The dispensing tube 60 is configured for insertion through the filling end 46 of the neck portion 44 of the fuel inlet 40. The dispensing tube 60 extends through the neck portion 44 to the bottom surface 36. The dispensing tube 60 dispenses the fuel 26 onto the bottom surface 36 of the fuel tank 22 in a smooth flow without spraying the fuel 26. Dispensing the fuel 26 in the smooth flow without spraying the fuel 26 prevents the fuel 26 from splashing into the fuel tank 22 and/or spit-back of the fuel 26 from the back flow prevention device 48 in the fuel inlet 40. Introducing the fuel 26 into the fuel tank 22 in a smooth flow without spraying the fuel 26 within the fuel tank 22 prevents the fuel 26 from flashing and instantaneously filling the entire fuel tank 22 with fuel vapors. Rather, by introducing the fuel 26 into the fuel tank 22 in a smooth flow without spraying the fuel 26 ensures that any fuel vapors formed during the initial fueling process of the green fuel tank 22 are disposed adjacent the bottom surface 36 of the fuel tank 22, which leaves unmixed air, e.g., air containing no or few fuel vapors, disposed adjacent the top surface 38 of the fuel tank 22 and the vapor outlet 50. Having the unmixed air adjacent the vapor outlet 50 ensures that the gas exhausted from within the fuel tank 22 during the initial fueling process of the green fuel tank 22 is unmixed air, and includes no or few fuel vapors. In other words, the amount of fuel vapor displaced from within the interior 34 of the fuel tank 22 is minimized by reducing the level of fuel vapors within the fuel tank 22, and by ensuring that the fuel vapors within the fuel tank 22 are disposed adjacent the bottom surface of the fuel tank 22. Introducing the fuel 26 into the fuel tank 22 in a smooth flow onto the bottom surface 36 of the fuel tank 22 minimizes vaporization of the fuel 26 and disposes any fuel vapors adjacent the bottom surface of the fuel tank 22, thereby minimizing the fuel vapor displaced into the atmosphere of the manufacturing plant. Minimizing the amount of fuel vapors released into the atmosphere of the manufacturing plant, reduces the amount of VOCs released into the atmosphere of the manufacturing plant, which improves the air quality within the manufacturing plant.

The dispensing tube 60 includes a length 62 sufficient to extend from the dispensing unit 54 to the bottom surface 36 of the fuel tank 22. More specifically, the dispensing tube 60 includes a length 62 sufficient to extend from the handle 56 of the dispensing unit 54, through the neck portion 44 of the fuel inlet 40 to the bottom surface 36 of the fuel tank 22. The length 62 of the dispensing tube 60 will accordingly vary with each specific design of the fuel tank 22 and relative location of the dispensing unit 54 to the fuel tank 22. It is anticipated that the length 62 of the dispensing tube 60 is approximately 36 inches. However, it should be appreciated that the length 62 of the dispensing tube 60 may be less than 36 inches.

The dispensing tube 60 includes a flexible material, such as rubber, a plastic material or some other similar material. It should be appreciated that the flexible material may include some other material or combination of materials not described herein, and may also include a protective outer covering, such as a flexible woven wire mesh or the like. The flexible material permits non-uniform curvilinear insertion of the dispensing tube 60 through the neck portion 44 of the fuel inlet 40 into the interior 34 of the fuel tank 22. The flexible material is rigid enough to prevent the dispensing tube 60 from binding within the neck portion 44 during insertion through the neck portion 44 and permit insertion of the dispensing tube 60 through the back flow prevention device 48 within the neck portion 44, yet is still flexible enough to bend and accommodate the curvilinear path of the neck portion 44 of the fuel inlet 40.

The invention also provides a method of filling the fuel tank 22 with the fuel 26. The method includes providing the fuel tank 22 in an unused and empty condition. New and unused fuel tanks 22 are often referred to as green fuel tanks 22. It should be appreciated that vehicles 24 are initially assembled with green fuel tanks 22. The green fuel tanks 22 do not include any fuel vapors within the interior 34 of the fuel tank 22 prior to filling the fuel tank 22 with the fuel 26. Accordingly, by limiting and or controlling the location of any fuel vapors within the fuel tank 22 during the initial filling process within the assembly plant, the air within the fuel tank 22 that is displaced during the initial fuel 26 filling process contains little if any fuel vapor mixed therein, thereby limiting the introduction of fuel vapors, and any VOCs contained therein, into the atmosphere of the manufacturing plant.

The method further includes installing the fuel tank 22 in a vehicle 24 prior to introducing the fuel 26 into the fuel tank 22. It should be appreciated that the assembly of the vehicle 24 includes many operations performed at many work stations along the conveyor system. It should also be appreciated that the fuel 26 filling process, in which the green fuel tank 22 is initially filled with fuel 26, or at least partially filled with fuel 26, occurs after the fuel tank 22 has been installed in the vehicle 24.

The method further includes providing the dispensing unit 54 configured to introduce the fuel 26 into the fuel tank 22. It should be appreciated that the dispensing unit 54 may be configured as described above, or alternatively, may be configured in some other manner not shown or described herein capable of selectively introducing the fuel 26 into the fuel tank 22.

The method further includes introducing the fuel 26 into the fuel tank 22 adjacent a bottom surface 36 of the fuel tank 22. As described above, introducing the fuel 26 into the fuel tank 22 adjacent the bottom surface 36 of the fuel tank 22 ensures that any fuel vapors formed during introduction of the fuel 26 into the fuel tank 22 are disposed adjacent the bottom surface 36 of the fuel tank 22, which limits exhaust of the fuel vapors formed within the fuel tank 22 through the vapor outlet 50. Introducing the fuel 26 into the fuel tank 22 may further be defined as introducing the fuel 26 onto the bottom surface 36 of the fuel tank 22 in a smooth flow without spraying the fuel 26 to minimize turbulence in the flow of fuel 26.

While the system for filling the fuel tank 22 described above describes inserting a flexible tube through the fuel inlet 40 disposed adjacent the top surface 38 of the fuel tank 22, it should be appreciated that the fuel 26 may alternatively be introduced under pressure through an opening 42 disposed adjacent the bottom surface 36 of the fuel tanks 22 as well.

As described above, the dispensing unit 54 may include an elongated flexible dispensing tube 60 extending from the dispensing unit 54 to the distal end 61. The method may further include inserting the elongated flexible dispensing tube 60 through the fuel inlet 40 until the distal end 61 of the dispensing tube 60 is disposed adjacent the bottom surface 36 of the fuel tank 22.

As described above, the fuel tank 22 contains a volume of air within the interior 34 of the fuel tank 22 prior to introducing the fuel 26 into the fuel tank 22. The method further includes exhausting at least a portion of the volume of air from within the fuel tank 22 through the vapor outlet 50 into the atmosphere of the manufacturing plant in response to introducing the fuel 26 into the fuel tank 22.

While the best modes for carrying out the invention have been described in detail, those familiar with the art to which this invention relates will recognize various alternative designs and embodiments for practicing the invention within the scope of the appended claims.

The invention claimed is:

1. A method of filling a fuel tank having a vapor outlet and a fuel inlet disposed adjacent a top surface of the fuel tank and a neck portion extending from the fuel inlet along a curvilinear path to a filling end, with a fuel including volatile organic compounds, the method comprising:
   providing a dispensing unit having an elongated flexible dispensing tube extending from the dispensing unit to a distal end and configured to introduce the fuel into the fuel tank;
   inserting the elongated flexible dispensing tube through the filling end of the neck portion, along the curvilinear path of the neck portion, and through the fuel inlet until the distal end of the flexible dispensing tube is disposed adjacent a bottom surface of the fuel tank; and
   introducing the fuel into the fuel tank adjacent a bottom surface of the fuel tank so that any fuel vapors formed during introduction of the fuel into the fuel tank are disposed adjacent the bottom surface of the fuel tank to limit exhaust of the fuel vapors through the vapor outlet during introduction of the fuel into the fuel tank.

2. A method as set forth in claim 1 wherein introducing the fuel into the fuel tank is further defined as introducing the fuel onto the bottom surface of the fuel tank in a smooth flow without spraying the fuel to minimize turbulence in the flow of fuel.

3. A method as set forth in claim 1 wherein inserting the elongated flexible dispensing tube through the fuel inlet until the distal end of the dispensing tube is disposed adjacent a bottom surface of the fuel tank is further defined as inserting the elongated flexible dispensing tube through the fuel inlet until the distal end contacts the bottom surface of the fuel tank.

4. A method as set forth in claim 1 further comprising installing the fuel tank in a vehicle prior to inserting the flexible dispensing tube through the neck portion of the fuel inlet.

5. A method as set forth in claim 4 further comprising providing the fuel tank in an unused and empty condition.

6. A method as set forth in claim 5 wherein the volatile organic compounds of the fuel include hydrocarbons.

7. A method as set forth in claim 6 wherein the fuel includes a Reid Vapor Pressure of at least 7 psi.

8. A method as set forth in claim 1 wherein the fuel tank contains a volume of air prior to introducing the fuel into the fuel tank and wherein the method further comprises exhausting at least a portion of the volume of air from within the fuel tank through the vapor outlet into the atmosphere in response to introducing the fuel into the fuel tank.

9. A method of filling a fuel tank having a fuel inlet disposed near a top surface of the fuel tank and a neck portion extending from the fuel inlet along a curvilinear path to a filling end, with a fuel including hydrocarbons, the method comprising:

providing a dispensing unit including an elongated flexible dispensing tube extending from the dispensing unit to a distal end;

inserting the elongated flexible dispensing tube through the filling end of the neck portion, along the curvilinear path of the neck portion, and through the fuel inlet until the distal end of the dispensing tube is disposed adjacent a bottom surface of the fuel tank;

introducing the fuel into the fuel tank adjacent the bottom surface of the fuel tank so that any fuel vapors formed during introduction of the fuel into the fuel tank are disposed adjacent the bottom surface of the fuel tank to limit exhaust of the fuel vapors through the vapor outlet during introduction of the fuel into the fuel tank; and withdrawing the flexible dispensing tube along the curvilinear path of the neck portion to remove the flexible dispensing tube from the fuel tank and the neck portion after the fuel is introduced into the fuel tank.

10. A method as set forth in claim 9 wherein introducing the fuel into the fuel tank is further defined as introducing the fuel onto the bottom surface of the fuel tank in a smooth flow without splashing the fuel to minimize turbulence in the flow of fuel.

11. A method as set forth in claim 10 wherein the fuel tank contains a volume of air prior to introducing the fuel into the fuel tank and wherein the method further comprises exhausting at least a portion of the volume of air from within the fuel tank through a vapor outlet into the atmosphere in response to introducing the fuel into the fuel tank.

12. A method as set forth in claim 11 further comprising installing the fuel tank in a vehicle prior to inserting the flexible dispensing tube through the neck portion of the fuel inlet.

13. A method as set forth in claim 12 further comprising providing the fuel tank in an unused and empty condition.

14. A method as set forth in claim 13 wherein the fuel includes a Reid Vapor Pressure of at least 7 psi.

15. A system for filling a fuel tank of a vehicle with a fuel including volatile organic compounds, the system comprising:

a conveyor apparatus configured for conveying a plurality of individual vehicles along an assembly line; and a dispensing unit disposed adjacent said conveyor apparatus and configured for dispensing the fuel into the fuel tank;

said dispensing unit including an elongated flexible dispensing tube extending from said dispensing unit to a distal end and configured for insertion through a neck portion of a fuel inlet of the fuel tank along a curvilinear path to a bottom surface of the fuel tank to dispense the fuel onto the bottom surface of the fuel tank in a smooth flow without splashing the fuel to minimize turbulence in the flow of fuel such that any fuel vapors formed during introduction of the fuel into the fuel tank are disposed adjacent the bottom surface of the fuel tank to limit exhaust of the fuel vapors through the vapor outlet during introduction of the fuel into the fuel tank.

16. A system as set forth in claim 15 wherein said dispensing tube includes a length sufficient to extend from the dispensing unit to the bottom surface of the fuel tank.

17. A system as set forth in claim 16 wherein said length is at least 36 inches.

18. A system as set forth in claim 16 wherein said dispensing tube includes a flexible material permitting non-uniform curvilinear insertion of said dispensing tube through the neck portion of the fuel inlet of the fuel tank.

19. A system as set forth in claim 16 wherein said distal end of said dispensing tube contacts said bottom surface of said fuel tank.

* * * * *